(12) United States Patent
Knoblauch

(10) Patent No.: US 9,140,335 B2
(45) Date of Patent: Sep. 22, 2015

(54) SHIFT GEARBOX FOR USE WITH AN ELECTRIC MACHINE

(71) Applicant: Dr. Ing. h.c. F. Porsche Aktiengesellschaft, Stuttgart (DE)

(72) Inventor: Daniel Knoblauch, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/195,065

(22) Filed: Mar. 3, 2014

(65) Prior Publication Data
US 2014/0256493 A1    Sep. 11, 2014

(30) Foreign Application Priority Data

Mar. 5, 2013  (DE) .......................... 10 2013 102 161

(51) Int. Cl.
| B60K 7/00 | (2006.01) |
| B60W 10/115 | (2012.01) |
| F16H 3/54 | (2006.01) |
| B60K 17/04 | (2006.01) |
| B60K 1/00 | (2006.01) |
| F16H 48/36 | (2012.01) |

(52) U.S. Cl.
CPC ................ *F16H 3/54* (2013.01); *B60K 7/0007* (2013.01); *B60K 17/046* (2013.01); *B60K 2001/001* (2013.01); *B60K 2007/0046* (2013.01); *B60K 2007/0061* (2013.01); *F16H 2048/364* (2013.01); *F16H 2200/0021* (2013.01); *F16H 2200/0034* (2013.01); *F16H 2200/2005* (2013.01); *F16H 2200/2033* (2013.01); *F16H 2200/2082* (2013.01)

(58) Field of Classification Search
CPC .. B60W 10/02; B60W 10/115; B60K 7/0007; B60K 17/046; B60K 2001/001; B60K 2007/0046; B60K 2007/0061; F16H 3/44; F16H 3/54; F16H 3/006; F16H 3/007; F16H 2200/2082; F16H 2200/0021; F16H 2200/0034; F16H 2200/2005; F16H 2200/2033; F16H 2048/364
See application file for complete search history.

(56) References Cited

U.S. PATENT DOCUMENTS

| 4,685,354 A * | 8/1987 | McCabria ........................ 475/5 |
| 2003/0232678 A1* | 12/2003 | Yamauchi et al. ................ 475/5 |
| 2009/0084653 A1* | 4/2009 | Holmes ........................ 475/149 |
| 2009/0211824 A1* | 8/2009 | Knoblauch et al. .......... 180/65.7 |

FOREIGN PATENT DOCUMENTS

| DE | 36 19 368 | 1/1987 |
| DE | 10 2010 031 746 | 1/2012 |

OTHER PUBLICATIONS

German Search Report of Nov. 27, 2013.

* cited by examiner

*Primary Examiner* — Jacob S Scott
(74) *Attorney, Agent, or Firm* — Gerald E. Hespos; Michael J. Porco; Matthew T. Hespos

(57) ABSTRACT

A shift gearbox (1) has two gears. An input shaft (2) of the gearbox (1) can be driven by an electric machine (3). The input shaft (2) is connected via at least one single-direction clutch (4) to an output shaft (5) of the gearbox (1). A planetary stage (6) arranged parallel to the clutch (4) is connected to the output shaft (5) of the gearbox (1) for driving a wheel (30) of a motor vehicle, or an axle (7) that has wheels (30). The planetary stage (6) is switchable. A shift gearbox of this type permits simple shifting of the gears of the gearbox while being of simple design.

16 Claims, 2 Drawing Sheets

SHIFT GEARBOX FOR USE WITH AN ELECTRIC MACHINE

CROSS REFERENCE TO RELATED APPLICATIONS

This application claims priority under 35 USC 119 to German Patent Appl. No. 10 2012 102 161.1 filed on Mar. 5, 2013, the entire disclosure of which is incorporated herein by reference.

BACKGROUND

1. Field of the Invention

The invention relates to a shift gearbox having two gears. An input shaft of the gearbox can be driven by an electric machine, and the input shaft is connected via at least one single-direction clutch to an output shaft of the gearbox.

2. Description of the Related Art

A known shift gearbox is used in conjunction with an electric machine with a rotor shaft that holds first and second spur gears. The first spur gear is connected fixedly to the rotor shaft and the second spur gear can be connected rotationally conjointly to the rotor shaft when a clutch is closed. The first spur gear meshes with a third spur gear that is mounted, via a freewheel, on a second shaft. The second shaft rotationally conjointly holds a fourth spur gear that engages with the second spur gear of the rotor shaft that can only be activated by the clutch. The shaft to which the freewheel of the gearbox is assigned rotationally conjointly holds a fifth spur gear that interacts with a gearwheel of a differential. Two wheels at the sides of a motor vehicle are assigned to two axle sections of an axle of the motor vehicle and can be driven via the differential.

A disadvantage of the configuration of this known shift gearbox is that the spur gears mounted on the rotor shaft are engaged permanently with the spur gears of the shaft arranged parallel to the rotor shaft.

The freewheel used in the gearbox is a single-direction clutch. If the other clutch is closed, the spur gear assigned to the clutch is connected rotationally conjointly to the rotor shaft, and the shaft arranged parallel to the rotor shaft is driven at such an angular velocity that the freewheel is overtaken. Accordingly the torque is transmitted with the freewheel being bypassed.

It is an object of the invention to develop a shift gearbox so that simple shifting of the gears of the gearbox is possible with a simple design.

SUMMARY OF THE INVENTION

The invention relates to a shift gearbox where a switchable planetary stage is arranged parallel to the clutch and is connected to the output shaft of the gearbox for driving a wheel or an axle.

The planetary stages or the planetary gear set rotates as a block. Thus, there is a power flow only via the single-direction clutch in the first gear. Switching to immobilize the planetary stage causes the shift into the second gear so that the single-direction clutch then is overtaken.

The shift gearbox is configured so that the input shaft is an intermediate shaft, and a rotor shaft of the electric machine is connected to the intermediate shaft via a spur gear stage or a planetary stage.

The single-direction clutch may be of various designs, such as a clutch with non-positively locking or positively locking action. The clutch, for example, may be a freewheel or a switchable clutch, such as a jaw clutch.

A switchable clutch may be designed to act in one direction of rotation in one switching position and to act in the opposite direction of rotation in another switching position. This design permits recuperation in one gear so that the electric machine can operate in a generator mode. The single-direction clutch permits a transmission of a torque only when the electric machine is in a motor mode. However, a modified jaw clutch enables a torque to be introduced into the electric machine in the opposite direction of rotation. This however requires a switchable design of the clutch.

The planetary stage preferably is designed so that the input shaft can, by means of the clutch, be placed in operative connection with an internal gear or an internal gear carrier of the planetary stage that is arranged parallel to the clutch. The internal gear or the internal gear carrier is connected to the output shaft of the gearbox. The internal gear carrier has external toothing that interacts with a gearwheel, such as a spur gear, that is connected rotationally conjointly to the output shaft.

The switching of the planetary stage may be realized in a variety of ways. However, it would be particularly advantageous if a sun gear of the planetary stage is immobilized for shifting the gears. The sun gear preferably is immobilized by an actuator, such as a brake and particularly a dry-running brake.

The shift gearbox may function for driving wheels arranged on both sides of the motor vehicle. Here, the output shaft interacts with a differential of two axle sections of the axle of the motor vehicle.

The shift gearbox also may function for driving a single wheel. Thus, two wheels of the same axle of the motor vehicle can be driven independently of one another by mirror-symmetrically arranged shift gearboxes. The planetary stages, in particular the sun gears, of the different powershift gearboxes can be immobilized jointly. An individual-wheel drive thus is realized, with two electric machines acting respectively on wheels via a respective single-direction clutch/planetary gearbox arrangement. Advantageously, only a single actuator is used to immobilize the two planetary stages or of the sun gears of the two planetary stages. Thus, for the shifting of the gears, only a single actuator is required, and furthermore, the simultaneous shifting of both drives is ensured.

The invention preferably relates to a shift gearbox having two gears for an electrically driven wheel or an axle. An electric machine is connected by a spur gear or a planetary stage to an intermediate shaft. The intermediate shaft is connected via at least one single-direction clutch, such as a freewheel, and via a planetary stage that is parallel to the clutch and that has a sun gear capable of being immobilized, and to a differential for driving the axle or to a gearwheel of a shaft of an axle section for driving an individual wheel. Thus, in the first gear, the planetary stage or the sun gear of the planetary stage is not fixed or braked, and there is a power flow via only two toothing stages, because the planetary gear set rotates as a block. The shift into the second gear is realized by immobilizing the planetary gear set or the sun gear so that the single-direction clutch is deactivated and the freewheel then is overtaken.

The shift gearbox according of the invention can be used to perform powershifts by means of brakes/clutches that interact with the planetary stage, and by means of the single-direction clutch, such as the freewheel. The powershift capability can be implemented with only one actuator. Additionally, the brake/clutch can be a dry-running brake so that slip losses are low and efficiency is high. The first or primary gear has only two toothing stages in the power flow and in motion, given that the switchable planetary gear set rotates as a block and is not part of the power flow. Hence, there are considerable efficiency advantages and there is no load on planetary gear set components. Very good fail-safe characteristics are obtained. There is thus the freewheel in the first gear and a normally open brake or clutch for the second gear. Use of a freewheel in the first gear, enables recuperation only in the second gear. The freewheel may be supplemented by a clutch, preferably a jaw clutch if recuperation capability in the first gear is required. It is preferable for only one actuator to be provided for the jaw clutch and the brake. In the case of this gearbox configuration, splash lubrication can be realized, whereby no oil pump is required. The configuration of the gearbox requires only a minimal number of radial shaft sealing rings, thus efficiency is high.

Further features of the invention will emerge from the appended drawing and the description of the preferred exemplary embodiments depicted in the drawing, without the invention being restricted to these.

DETAILED DESCRIPTION OF THE PREFERRED EMBODIMENTS

Figure 1:
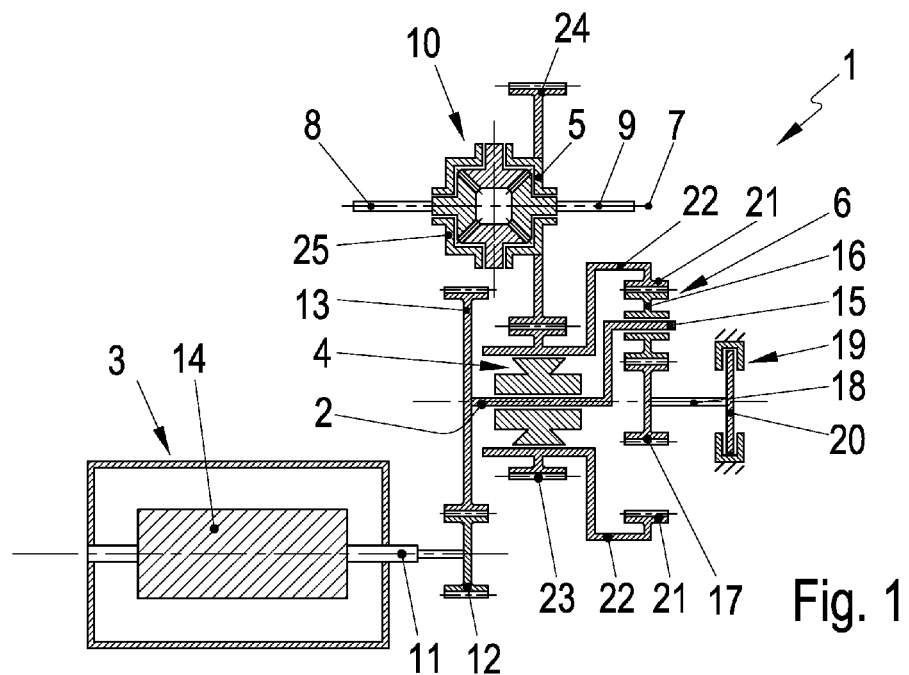
FIG. 1 schematically illustrates a first exemplary embodiment of the shift gearbox, connected to an electric machine and to a differential gearbox.

FIG. 1 shows a shift gearbox 1 having two gears. An input shaft 2 of the gearbox 1 has an input shaft 2 that can be driven by an electric machine 3. The input shaft 2 is connected via a single-direction clutch 4 to an output shaft 5 of the gearbox 1. A planetary stage 6 or planetary gear set is arranged parallel to the clutch 4 and is connected via a spur gear stage 23, 24 to the output shaft 5 for driving an axle 7 of a motor vehicle and hence the two wheels of the axle. The axle 7 has two shafts 8 and 9 connected respectively to the wheels. A differential gearbox 10 acts between the two shafts 8 and 9, and has an input formed by the output shaft 5.

More particularly, the input shaft 2 is an intermediate shaft. A rotor shaft 11 of the electric machine 3 is connected rotationally conjointly to a spur gear 12 that meshes with a spur gear 13 connected rotationally conjointly to the input shaft 2 of the gearbox 1. The rotor of the electric machine 3 is denoted by the reference numeral 14. A stage of planetary type of construction may be provided instead of the spur gear stage formed by the spur gears 12 and 13.

The clutch 4 is in the form of a freewheel, for example one that uses clamping rollers. Optionally, a combination with a jaw clutch and corresponding actuators may be provided if it is desired for the electric machine 3 to be operated in a generator mode, and thus in a recuperation mode, instead of the motor mode.

The planetary stage 6 has a planet carrier 15 that holds planet gears 16 and is connected rotationally conjointly to the input shaft 2 of the gearbox 1. The planet gears 16 mesh with a sun gear 17 that is connected rotationally conjointly to a shaft 18. The shaft 18 and the sun gear 17 can be immobilized by an actuator 19 in the form of a brake. The actuator 19 can be switched and clamps a brake disk or brake discs 20 connected rotationally conjointly to the shaft 18, similarly to brakes in automatic gearboxes. The brake preferably is a dry-running brake.

The planet gears 16 also mesh with an internal gear 21 of the planetary stage 6. The internal gear 21 interacts with an internal gear carrier 22, which interacts with the freewheel clutch 4. A radially outer part of the internal gear carrier 22 has a spur gear 23 that meshes with a spur gear 24 that is connected rotationally conjointly to the output shaft 5. The output shaft 5 and a differential casing 25 form a structural unit.

In the first or primary gear, only two toothing stages are in the power flow and in motion when the actuator 19 is in a functional position where the sun gear 17 is not immobilized. Specifically, in the first gear, the rotor 14 drives the rotor shaft 11 and the spur gear 12. The spur gear 12 then drives the spur gear 13. The spur gear 13 drives the input shaft 2, and the input shaft 2 drives the internal gear carrier 22 and the spur gear 23 via the freewheel clutch 4. The spur gear 23 drives the spur gear 24, which, in turn, drives the two shafts 8 and 9 assigned to the wheels of the motor vehicle via the differential gearbox 10. The switchable planetary stage 6 rotates as a block and is not in the power flow.

The actuator 19 can be activated so that the brake disk 20 immobilizes the sun gear 17, and so that the shift gearbox 2 is in the second gear (secondary gear). With the sun gear 17 stationary, the torque flow passes from the rotor 14 via the rotor shaft 11 to the spur gear 12, from there to the spur gear 13 and into the input shaft 2, which rotates at such an angular velocity that the freewheel is overtaken. The planet carrier 15 rotates at the same angular velocity as the input shaft 2 and the planet gears 16 driven by the planet carrier 15 drive the internal gear 21. Accordingly, the internal gear carrier 22 rotates at the same angular velocity as the internal gear 21. The internal gear carrier 22 drives the spur gear 23 fixedly connected thereto, and the spur gear in turn drives the shafts 8 and 9 via the spur gear 24 and the differential gearbox 10.

If a freewheel clutch 4 is used, recuperation is possible only in the second gear due to the configuration of the gearbox in the illustrated embodiment. The freewheel is supplemented by a clutch, preferably a jaw clutch, if recuperation capability in the first gear is required. It is preferable for only one actuator to be provided for the jaw clutch and the brake.

Figure 2:
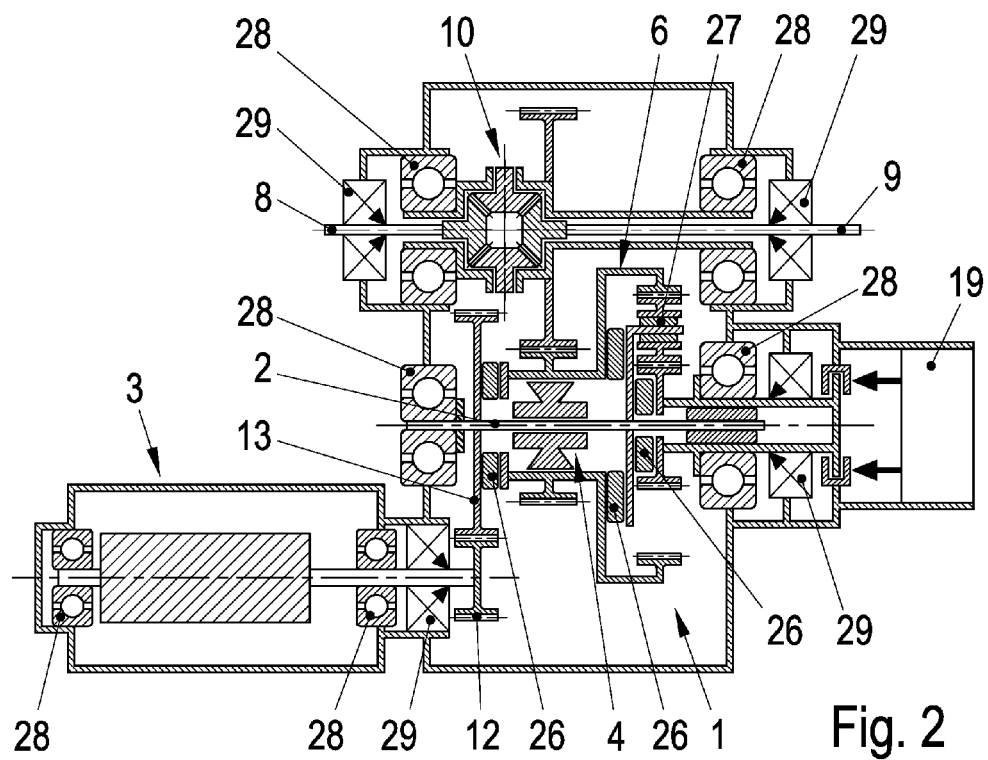
FIG. 2 shows a preferred bearing and seal concept for the shift gearbox of the first exemplary embodiment, FIG. 3 schematic illustrates a second embodiment of the shift gearbox with a mirrored arrangement of two shift gearboxes, the respective shift gearbox interacting with one electric machine and a single wheel of an axle of a motor vehicle.

FIG. 2 shows the bearing and seal concept. The reference numeral 26 denotes first bearings, which, in this arrangement, are axial bearings, and preferably axial needle-roller bearings. The reference numeral 27 denotes second bearings, which, in this arrangement, are radial bearings, and preferably radial (needle-roller) bearings. The reference numeral 28 denotes third bearings, which in this arrangement are deep-groove ball bearings, angular-contact ball bearings, tapered-roller bearings or cylindrical-roller bearings. The reference numeral 29 denotes four radial shaft sealing rings. The actuator 18 is a brake actuator, and may be provided in different design variants, and may exhibit electromotive, electromagnetic, hydraulic or pneumatic action.

Figure 3:
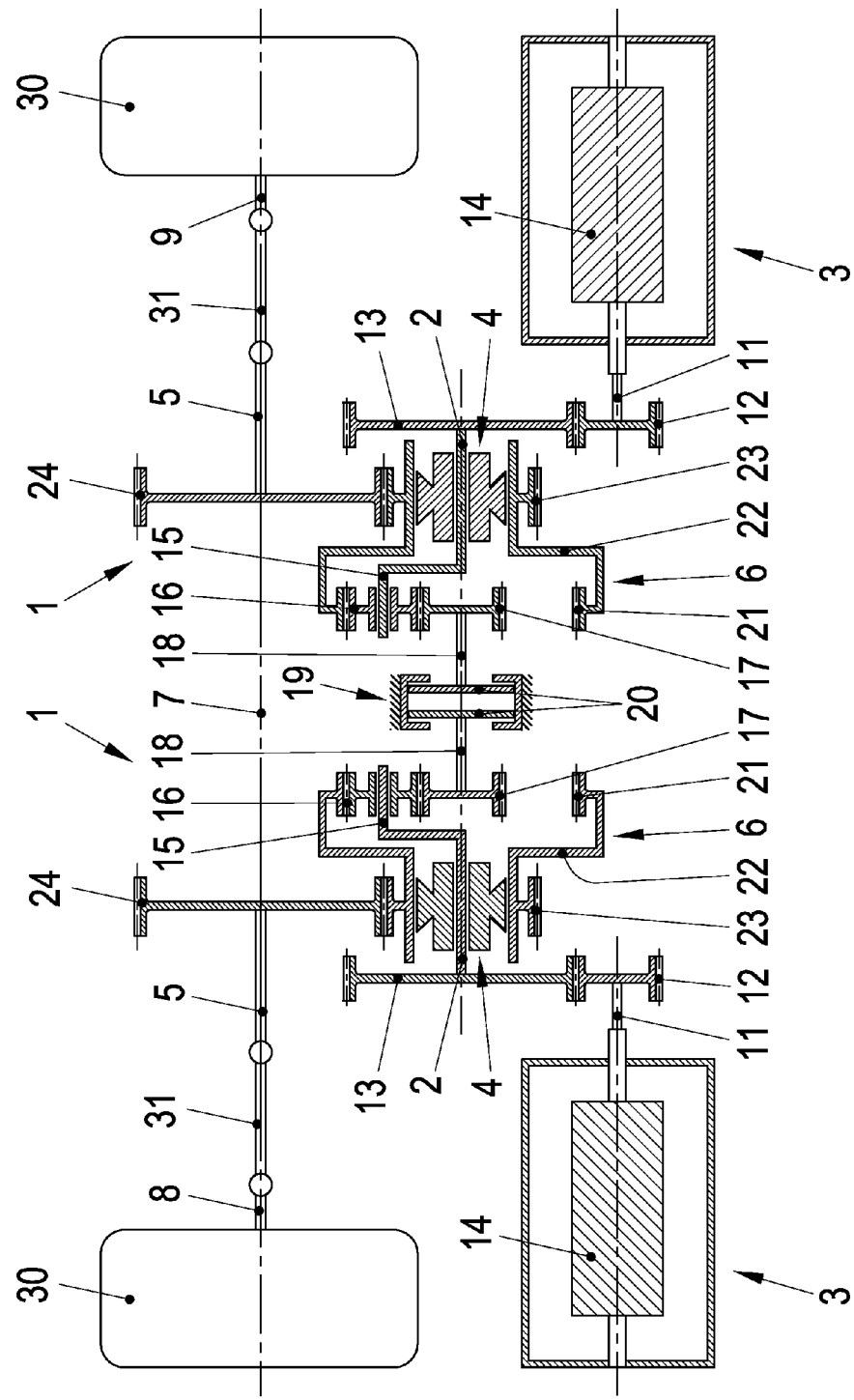

The embodiment of FIG. 3 differs from FIG. 1 in that two mirror-symmetrically arranged shift gearboxes 1, 1 are provided instead of one shift gearbox. By contrast to the embodiment of FIG. 1, a common actuator 19 is provided for the brake discs 20 assigned to the two gearboxes 1, 1, so that the two sun gears 17 of the two gearboxes 1, 1 can be immobilized and released simultaneously. At the drive output side, the spur gear 24 does not interact with the output shaft 5 assigned to the differential gearbox 10. Rather, the output shaft 5 is connected fixedly to the respective shaft 8 or 9. The embodiment of FIG. 3 is an individual-wheel drive for the wheels 30 of the axle 7 of the motor vehicle. The respective shaft 8 or 9 interacts with the wheel 30 assigned thereto via an articulated shaft 31.

The embodiment of FIG. 3 with the two shift gearboxes 1, 1, operates in substantially the same way as the embodiment of FIG. 1. The bearing concept of the embodiment of FIG. 3 corresponds to the embodiment of FIG. 1. With regard to the seal concept, six radial shaft sealing rings are provided in the embodiment of FIG. 3.

The arrangement of FIG. 1 may be regarded as a base solution or drive which, when provided in duplicate, yields the arrangement of FIG. 3, in the manner of a modular system.

What is claimed is:

1. A shift gearbox having first and second gear ratios, the gearbox comprising:
    an input shaft that can be driven by an electric machine,
    a clutch for connecting the input shaft to an output shaft of the gearbox,
    a planetary stage arranged parallel to the clutch, the planetary gear stage having:
        a sun gear,
        planetary gears surrounding and engaged with the sun gear and being connected to the input shaft, and
        a gear carrier having an internal gear surrounding and engaged with the planetary gears and having an external toothing connected to the output shaft of the gearbox for driving a wheel of a motor vehicle, or an axle that has wheels; and
    a brake actuator for selectively immobilizing the sun gear so that the planetary stage is switchable between a condition where the sun gear is rotatable so that all of the planetary stage rotates without being in a power flow from the input shaft to the output shaft to define the first gear ratio and an immobilized condition where the input shaft rotates the planet gears about the immobilized sun gear to define the second gear ratio.

2. The shift gearbox of claim 1, wherein the input shaft is an intermediate shaft, the electric machine having a rotor shaft connected to the input shaft via an input spur gear.

3. The shift gearbox of claim 2, wherein the clutch is a clutch with non-positively locking or positively locking action.

4. The shift gearbox of claim 3, wherein the clutch is in the form of a freewheel.

5. The shift gearbox of claim 3, wherein the clutch is in the form of a switchable clutch.

6. The shift gearbox of claim 5, wherein the switchable clutch is a jaw clutch.

7. The shift gearbox of claim 1, wherein the clutch is a switchable clutch that acts in one direction of rotation in one switching position and acts in an opposite direction of rotation in another switching position.

8. The shift gearbox of claim 1, wherein the clutch can place the input shaft in operative connection with the internal gear of the gear carrier of the planetary stage.

9. A shift gearbox having two gear ratios, the gearbox comprising: an input shaft that can be driven by an electric machine, the input shaft being connected via at least one single-direction clutch to an output shaft of the gearbox, a planetary stage being parallel to the clutch and being connected to the output shaft of the gearbox for driving a wheel of a motor vehicle, or an axle that has wheels, wherein the planetary stage is switchable, the clutch being configured to place the input shaft in operative connection with an internal gear carrier of the planetary stage that is arranged parallel to the clutch, the internal gear carrier being connected to the output shaft of the gearbox, and wherein the internal gear carrier has an external toothing that interacts with a spur gear connected rotationally conjointly to the output shaft.

10. A shift gearbox having two gear ratios, the gearbox comprising: an input shaft that can be driven by an electric machine, the input shaft being connected via at least one single-direction clutch to an output shaft of the gearbox, a planetary stage being parallel to the clutch and being connected to the output shaft of the gearbox for driving a wheel of a motor vehicle, or an axle that has wheels, wherein the planetary stage is switchable, and wherein a sun gear of the planetary stage can be immobilized for shifting the gear ratios.

11. The shift gearbox of claim 10, further comprising a brake actuator for immobilizing the sun gear.

12. The shift gearbox of claim 1, wherein the brake actuator is a dry-running brake.

13. The shift gearbox of claim 1, wherein the gearbox drives wheels arranged on both sides of the motor vehicle, the output shaft interacting with a differential gearbox of two axle sections of the axle of the motor vehicle.

14. A shift gearbox assembly comprising first and second mirror symmetrical shift gear-boxes for driving first and second wheels on a single axle of a motor vehicle, the first and second gearboxes respectively having first and second input shafts that can be driven respectively by first and second electric machines, the input shaft of each of the gear-boxes being connected via at least one single-direction clutch to an output shaft of the respective gearbox, each of the gear boxes further having a planetary stage parallel to the respective clutch and being connected to the output shaft of the respective gearbox for driving one of the wheels of a motor vehicle, wherein the planetary stages are switchable and have sun gears that can be jointly immobilized.

15. The shift gearbox of claim 14, wherein a single actuator is operatively connectable with the sun gears of the planetary stages.

16. The shift gearbox of claim 15, wherein the single direction clutches of the gearboxes are switchable clutches that can be switched by the single actuator.

* * * * *